United States Patent [19]
Geertz

[11] 3,885,162
[45] May 20, 1975

[54] OPTICAL MEASURING APPARATUS

[75] Inventor: Lloyd M. Geertz, Monroeville, Pa.

[73] Assignee: Contraves-Goerz Corporation, Pittsburgh, Pa.

[22] Filed: July 1, 1974

[21] Appl. No.: 484,798

Related U.S. Application Data

[63] Continuation-in-part of Ser. No. 411,420, Oct. 31, 1973, abandoned.

[52] U.S. Cl. ............... 250/573; 250/573; 256/216; 356/207; 340/237 S
[51] Int. Cl. ........................................... G01n 21/12
[58] Field of Search .......... 250/573, 574, 216, 233, 250/572, 56 Y, 565, 578; 340/237 S; 356/201, 205, 207, 208

[56] References Cited
UNITED STATES PATENTS

| | | | |
|---|---|---|---|
| 2,877,453 | 3/1959 | Mendenhall, Jr. | 340/237 S |
| 3,041,461 | 6/1962 | Lindemann et al. | 250/572 |
| 3,528,750 | 9/1970 | Hach | 250/574 |
| 3,554,655 | 1/1971 | Einstein | 356/207 |
| 3,617,756 | 11/1971 | Sick | 356/207 |

Primary Examiner—Walter Stolwein
Attorney, Agent, or Firm—D. T. Innis

[57] ABSTRACT

A measuring apparatus for measuring the density of smoke and the like comprising a light source for emitting a beam of radiant energy which is directed through the smoke which is to be measured, and a first reflector positioned in the path of said beam for redirecting said beam. Chopping means are movable periodically into the path of the beam for interrupting the passage of the beam to the first reflector means. A second reflector means on the chopping means is movable in the path of the beam when the beam is interrupted by said chopping means. Means are provided for directing the light reflected by the first reflector means and the reflector means to a light sensitive means.

This invention relates to optical measuring apparatus and particularly to measuring apparatus for measuring the optical transmittance of smoke and the like.

12 Claims, 4 Drawing Figures

OPTICAL MEASURING APPARATUS

CROSS-REFERENCE TO RELATED APPLICATION

This application is a Continuation-in-Part of co-pending application Ser. No. 411,420, Filed Oct. 31, 1973, now abandoned.

BACKGROUND OF THE INVENTION

One of the methods that has been proposed and used for determining the concentration of smoke or the like is to measure the optical transmittance of smoke by directing a beam through the smoke. Theoretically, the greater the transmission through the smoke, the less the density of the smoke.

Among the prior art methods and devices for measuring transmittance is that disclosed in U.S. Pat. No. 3,617,756 wherein a light beam is transmitted through the smoke toward a retro-reflector and redirected back to light sensitive means. In order to provide a standard, such a device utilizes a second retro-reflector positioned to have a portion of the beam directed thereto.

Among the objects of the present invention are to provide an improved system which utilizes a lesser number of parts, compensates for changes in source output, detector sensitivity and dirt in the system, and which can be manufactured at a relatively lower cost and maintained more readily with greater ease.

DESCRIPTION

Figure 1:
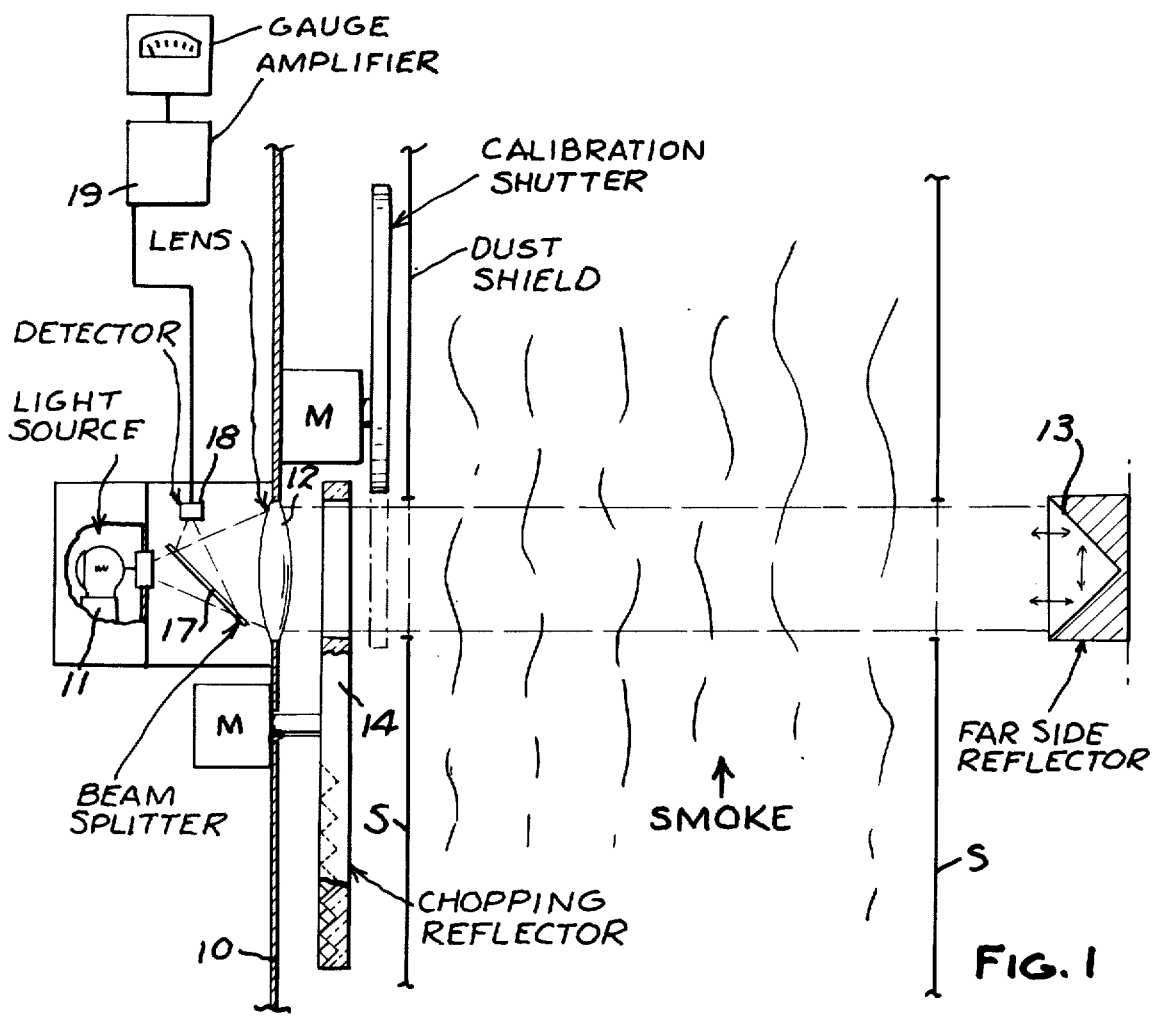
FIG. 1 is a diagrammatic view of an apparatus embodying the invention.
Figure 2:
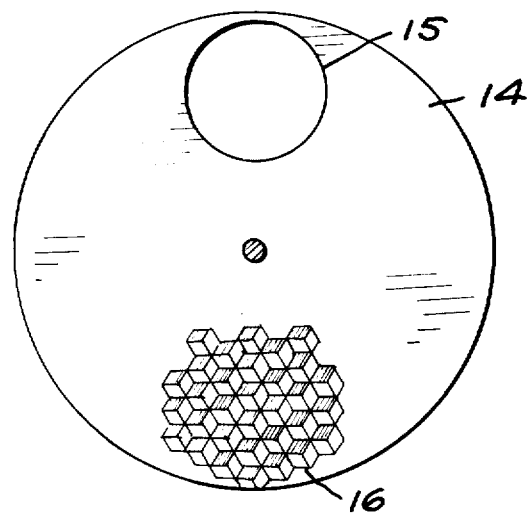
FIG. 2 is a fragmentary plan view of a portion of the apparatus.
Figure 3:
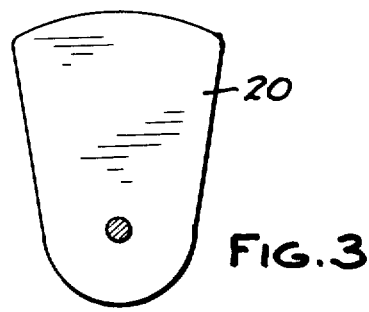
FIG. 3 is a plan view of another portion of the apparatus.

Basically, the invention comprises a device adapted to be mounted adjacent to or on a stack 10. The device comprises a light source 11 positioned externally of the stack for directing a beam of radiant energy such as visible light to a lens 12 which, in turn, projects a substantially collimated beam of light transversely of the stack to a first retro-reflector 13 such as a cube corner reflector, mounted adjacent the opposite side of stack 10. The apparatus further includes an aperture disc 14 having at least one opening 15 that functions to chop the collimated light beam (FIG. 2). Those portions of the disc 14 that are intermediate the openings 15 are provided with a second retro-reflector 16 of the cube corner type facing in the direction of the light source. The beam from the light source 11 passes through a beamsplitter 17 and any light returned by either of the reflectors 13 or 16 is reflected by the beamsplitter 17 to a detector 18 sensitive to the radiation produced by the light source 11.

The retro-reflectors may be a single, corner cube, a multiple arrangement of corner cubes or simple reflectors and the two retro-reflectors need not be of the same type. A corner cube reflector comprises three plane mirrors with surfaces mutually perpendicular, so that a ray of light will be returned after three reflections, on a path parallel to its original path. Multiple arrays of corner cubes are often molded from plastic, as with bicycle reflectors, or the reflectors may be made by bonding suitable material to a substrate as with Scotchlite brand reflector material.

Dust shields S may be provided to minimize deposition of smoke particles on the functioning portions of the apparatus that are exposed to stack emissions and, in addition, air may be blown across the parts from a blower, not shown.

In operation, light from the light source 11 passes through the beamsplitter 17 and the lens 12 which, as shown, can be a window between the enclosed instrument and the "dirty region" of the stack. The window on both this side and the reflector side is normally protected by a clean air flow, but this is not essential to the invention. The light beam is chopped by apertured disc 14 and, alternately, reflected back into the instrument from the disc reflector or allowed to proceed to the far side reflector 13 through the smoke where it is also returned to the instrument after being attenuated by the smoke. The return beam passes through the lens 12 and is directed to detector 18 by the beamsplitter 17. The beamsplitter is a partially reflecting and partially transmitting, half-silvered mirror so that some light is lost at the beamsplitter. Thus, the detector alternately sees light that is reflected by the chopping reflector 14, without attenuation by the smoke, and light that has been attenuated by passing twice through the smoke. If the system is balanced, the light on the detector should be constant (D.C.) for the case of a clear stack and alternate a maximum amount for the case of an opaque smoke plume. By placing the reflective chopper 14 in the dirty region dirt on the lens or window and dirt on the reflectors will normally not cause any error as long as the chopping reflector and the far-side reflector soil at the same rate. Variations in the light source output and detector sensitivity will affect both light paths equally and will not contribute to zero drift. To calibrate for the opaque plume (maximum output), a calibration shutter 20 may be used to simulate the opaque plume. Signal processing consists of amplifying the AC signal. There is need for no other processing of a reference signal.

Figure 4:
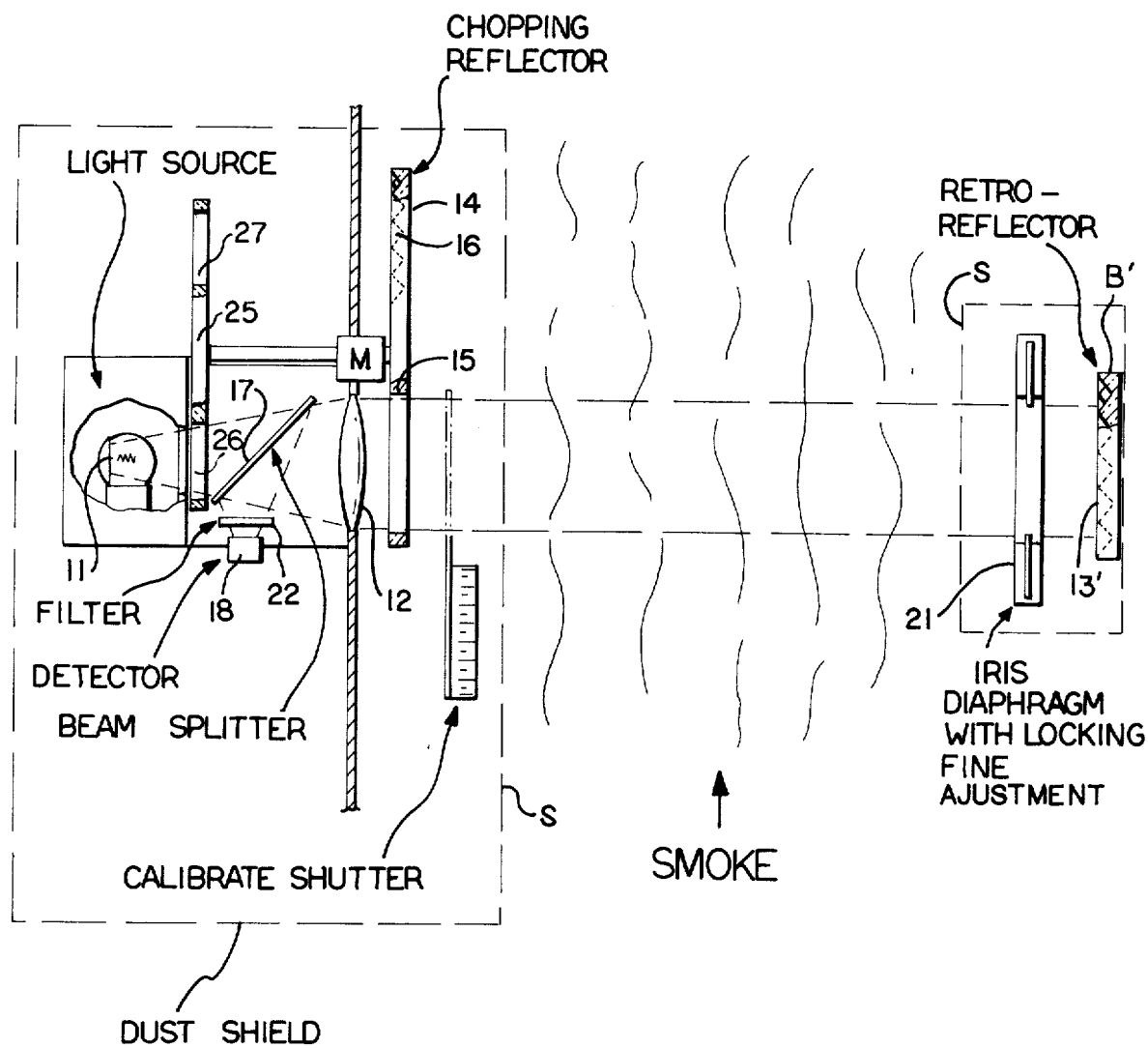
FIG. 4 is a similar view of a further modified form of the invention.

In the form of the invention shown in FIG. 4, an iris diaphragm 21 is added in front of the multi-faceted reflector 13', permitting control of the area illuminated by the beam, making balance of the system for a clear stack condition easier. In addition, a color filter 22 is provided in front of detector 18.

A second chopping disc 25 having at least a pair of apertures 26 and 27 is provided between the light source and the projecting lens. This disc or chopper 25 may be driven by the same motor as is used to drive the chopper 14. By utilizing the same motor, both choppers may be assured of being in synchronism. As in the previous embodiment, a calibrate shutter may be periodically moved into the path of the light beam to, in effect, serve as an opaque filter. As previously stated, this has the effect of simulating a sufficiently dense smoke to be opaque to transmission of light.

In both forms of the invention, the signal output is proportional to the opacity of the stack. As a result, the output is less affected by drift of amplifier gain.

I claim:

1. In a measuring apparatus for measuring smoke density and the like, the combination comprising a stack or duct;

a light source for emitting a beam of radiant energy through a portion of the stack;

first retro-reflector means in the path of said beam for redirecting said beam after it passes through the stack;

chopping means in the stack movable periodically into the path of the beam for interrupting the passage of the beam to the first reflector means;

second retro-reflector means on the chopping means movable in the path of the beam when the beam is interrupted by said chopping means;

light sensitive means externally of the stack; and means for directing the light reflected by said first reflector means and said second reflector means to said light sensitive means.

2. The combination set forth in claim 1 wherein said chopping means comprises a rotating disc having an aperture therein;

said second retro-reflector means being mounted on said disc.

3. The combination set forth in claim 1 wherein said means for directing said light from said first reflector means and said second reflector means comprises beamsplitter means externally of the stack between the light source and said first reflector means;

said beamsplitter means redirecting the light from said first reflector means and said second reflector means to said light sensitive means.

4. The combination set forth in claim 1 including second aperture means in the stack between said light source and said first aperture means.

5. The combination set forth in claim 1 including a lens between said light source and said first reflector means.

6. The combination set forth in claim 1 including filter means in the path of light directed to said light sensitive means.

7. In an optical measuring apparatus, the combination comprising a light source for emitting a beam of radiant energy;

a first reflector in the path of said beam for redirecting said beam;

chopping means movable periodically into the path of the beam for interrupting the passage of the beam to the first reflector means;

second retro-reflector means on the chopping means movable in the path of the beam when the beam is interrupted by said chopping means;

light sensitive means; and means for directing the light reflected by said first reflector means and said second reflector means to said light sensitive means.

8. The combination set forth in claim 7 wherein said chopping means comprises a rotating disc having an aperture therein, said second retro-reflector means being mounted on said disc.

9. The combination set forth in claim 7 wherein said means for directing said light from said first reflector means and said second reflector means comprises beamsplitter means between the light source and said first reflector means;

said beamsplitter means redirecting the light from said first reflector means and said second reflector means to said light sensitive means.

10. The combination set forth in claim 7 including second chopping means between said light source and said first chopping means.

11. The combination set forth in claim 7 including a lens between said light source and said first reflector means.

12. The combination set forth in claim 7 including filter means in the path of light directed to said light sensitive means.

* * * * *